M. Mitchell.
Corn Planter.
Nº 26,033. Patented Aug. 9, 1859.
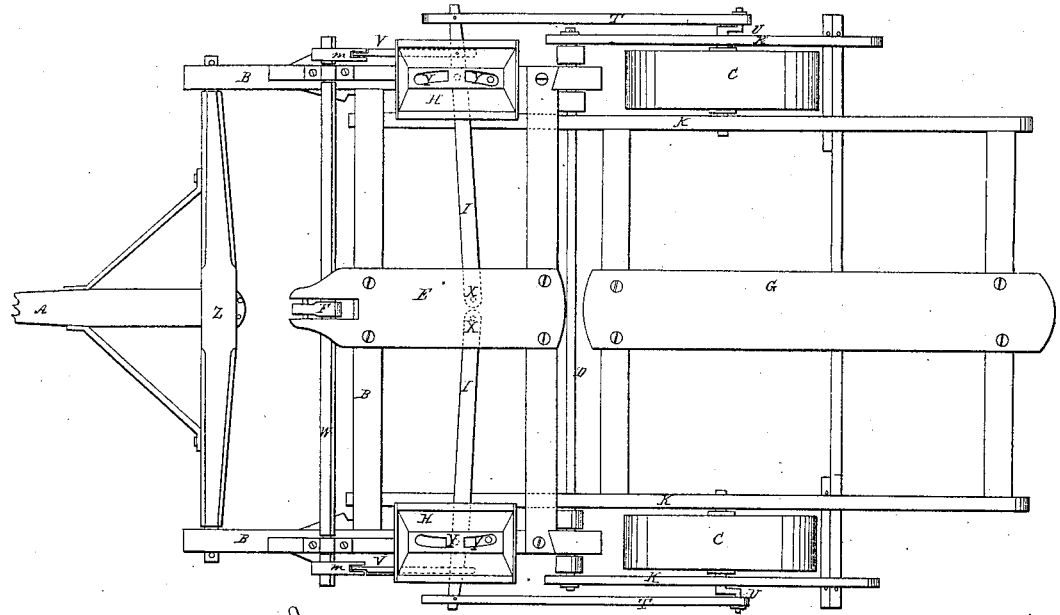
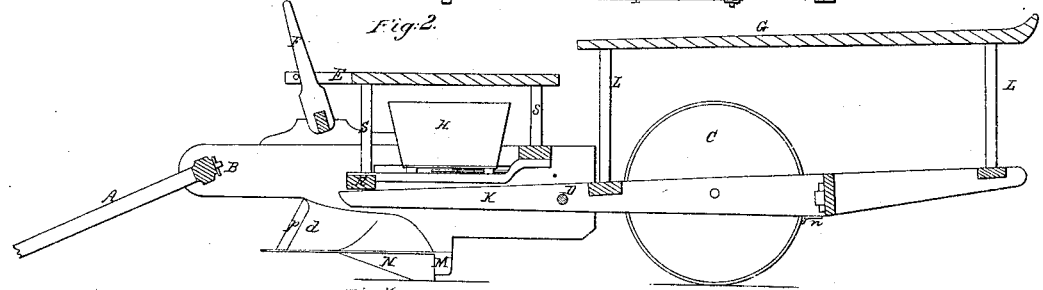
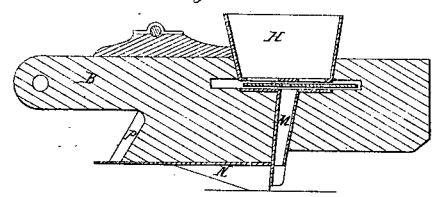

UNITED STATES PATENT OFFICE.

MATTHEW MITCHELL, OF ALTONA, ILLINOIS.

IMPROVEMENT IN CORN-PLANTERS.

Specification forming part of Letters Patent No. 25,033, dated August 9, 1859.

*To all whom it may concern:*

Be it known that I, MATTHEW MITCHELL, of Altona, in the county of Knox and State of Illinois, have invented certain new and useful Improvements in Seed-Planters; and I do hereby declare that the following is a full, clear, and exact description of the same, reference being had to the accompanying drawings, forming a part of this specification, in which—

Figure 1 is a top view of the seed-planter. Fig. 2 is a side view of the same. Fig. 3 is a side view of one of the hoppers, a part of the frame and one of the cutters; and Fig. 4 is an inverted view of the shoe and cutter.

Similar letters of reference in each of the several figures indicate corresponding parts.

The nature of my invention consists in a new and useful arrangement and combination of the parts of a seed-planter, and is designed to plant sod-ground by cutting through and depositing the seed under the sod; or it may be applied to planting old and mellow ground.

To enable others skilled in the art to make and use my invention, I will proceed to describe its construction and operation.

In the drawings,—A is the tongue of the seed-planter, attached to the cross-beam Z, which is fastened loosely in the holes in the frame B, as shown.

C C are the wheels of the machine, hung in journals in the rear frame, K, of the machine. The frame K is hung upon the axis D, which has its bearings in the main frame B of the machine. The side beams, K, of the frame pass under and rest upon the cross-beam R of the frame B.

E G are the drivers' seats. L L are the uprights which support them. The rear frame, K, being attached to the main frame B by the axis D, as described, enables the driver, by shifting his position, or by throwing his weight toward the rear part of the machine, to elevate the cutters when it may be deemed necessary.

U U are cranks attached to the axles of the wheels C. To the cranks U U are attached the levers T T, the latter being connected by pins or other equivalent device with the levers I I, which are pivoted at X X to the frame of the machine. The levers I I are T-shaped at their outer ends, and by the forward motion of the machine have a reciprocating motion through the cranks U U and levers T T. There are two apertures, Y Y, in the bottom of each hopper for the downward passage of the seed, and two corresponding openings in the T-shaped piece of the levers I I.

S is a shoe, having its edges sharpened for the purpose of removing weeds or obstructions in the path of the cutter N.

P is the colter, and M M are tubes or openings, situated directly in rear of the cutters N N, down which the seed passes from the hoppers. The cutters N N open the ground for the reception of the seed, and the seed drops through the rear or heel of them into the ground at the proper depth. The cutters are so made that the seed can be planted at any required depth by moving them higher or lower by means of bolts by which they are attached to the shoes.

V V are short levers, connected to the arms I by pins or other equivalent devices, and attached at their opposite extremities to the cranks m m, the latter being connected, as shown, to the axis hung in journals in the main frame B of the machine.

F is a lever, situated near the seat E, for operating the seeding apparatus when planting in hills, or when it is desired to plant the seed at closer intervals. In this case the levers T T are ungeared, and the operator, located on the seat E, operates the seeding apparatus by means of the lever F and its connections. The shares, the colters P, and mold-board form double plows. Other corn-planters deposit the seed among the weeds, leaving them in the rows and hills to come up with the seed, whereas my machine plows a shallow furrow and plants the seed in a clean hill.

What I claim as my invention, and desire to secure by Letters Patent, is—

The arrangement of the frame B, seats E and G, hoppers H, shoes S, and cutters N with the devices for operating them, in combination with the frame K, hung on the axle D, and with the slides, operated as described, the whole being constructed and arranged substantially in the manner and for the purposes set forth.

MATTHEW MITCHELL. [L. S.]

Witnesses:
SAML. P. WHITING,
CHARLES DAVIS.